United States Patent Office 3,197,957
Patented Aug. 3, 1965

3,197,957
PROPELLANT COMPOSITION AND METHOD
Barnet R. Adelman, Los Angeles, Calif., assignor, by mesne assignments, to Thompson Ramo Wooldridge Inc., Cleveland, Ohio, a corporation of Ohio
No Drawing. Filed Oct. 8, 1958, Ser. No. 766,642
10 Claims. (Cl. 60—35.4)

This invention relates to rocket propellants and has particular reference to a novel rocket propellant composition and a method for use of the same.

One of the primary objects of the present invention is to provide a novel composition capable of use as a mono-propellant for rockets.

Ozone is a powerful oxidizer and produces, when combined with hydrocarbon fuels such as kerosene, or with ammonia and related materials, high performance by-propellant systems for liquid propellant rocket engines. Bi-propellants are disadvantageous, however, from the standpoint that they require separate storage and pumping systems, and, due to inherent difficulties in proper metering of the precise ratios of the two components, require propellant utilization systems or excess supply of at least one of the two components, resulting in extra, unproductive loading of the missile. Moreover, ozone itself is disadvantageous in that it is poisonous and sensitive to deterioration and subject to explosion and/or detonation from impact and thermal shock.

An important object of the present invention is to provide an ozone-containing compound which is suitable for use as a mono-propellant for liquid and propellant rocket engines and which is not subject to the above-mentioned disadvantages of ozone or other ozone compounds.

Still another object of the present invention is to provide a novel mono-propellant composition having a specific impulse at least equal to that of recognized high performance by-propellant systems.

Other objects and advantages of this invention it is believed will be readily apparent from the following detailed description of preferred embodiments thereof.

Briefly, this invention comprehends within its scope the discovery that ammonium ozonate, $NH_4O_3$, either alone or in combination with other fuels, is particularly advantageous as a rocket propellant. The ammonium ozonate can be used alone or with other fuels as a mono-propellant, thus permitting the use of a single tank, single pump or gas pressurized propulsion system without any requirement for propellant utilization systems such as are required in bi-propellant systems to insure complete usage of propellants. As a mono-propellant, the specific impulse of ammonium ozonate is between $$275 \text{ and } 295 \frac{\text{lb. f.}}{\text{lb. m.}} \text{sec.}$$

which compares quite favorably with high performance bi-propellant combinations such as ozone and ammonia, which produces a specific impulse of $$265 \frac{\text{lb. f.}}{\text{lb. m.}} \text{sec.}$$

Inasmuch as ammonium ozonate alone is somewhat unstable it is preferred to use it in combination with a basic nitrogenous compound selected from the group consisting of ammonia and amines such as hydrazine and unsymmetrical di-methyl hydrazine, or in combination with hydrocarbon fuels such as kerosene. The proportion of ammonium ozonate in the propellant is preferably at least about 70% by weight of the composition. As a specific example a mono-propellant composition within the scope of this invention comprises a solution of ammonium ozonate in liquid ammonia, in stoichiometric proportions consisting of 198 parts of ammonium ozonate to 34 parts of liquid ammonia. This composition ($3NH_4O_3 + 2NH_3$) produces a specific impulse of between $$275 \text{ and } 295 \frac{\text{lb. f.}}{\text{lb. m.}} \text{sec.}$$

The composition is simply prepared by mixing the ammonium ozonate into the liquid ammonia. The propellant composition is used in the same manner as conventional propellants, i.e., it is fed to the missile reaction chamber and ignited therein by any suitable means, such as by a standard pyrotechnic igniter commonly employed in both the solid propellant and the liquid propellant rocket engine arts, or by a suitable catalyst.

Having fully described my invention, it is to be understood that I do not wish to be limited to the details set forth, but my invention is of the full scope of the appended claims.

I claim:

1. A rocket propellant composition consisting essentially of ammonium ozonate and liquid ammonia in which the ammonium ozonate constitutes at least about 70 percent by weight of the composition.

2. A rocket propellant composition consisting essentially of ammonium ozonate and kerosene in which the ammonium ozonate constitutes at least about 70% by weight of the composition.

3. A rocket propellant composition consisting essentially of ammonium ozonate in solution with hydrazine in which the ammonium ozonate constitutes at least about 70% by weight of the composition.

4. A rocket propellant composition consisting essentially of ammonium ozonate and a fuel, said fuel being selected from the group consisting of liquid hydrocarbons and basic nitrogenous compounds selected from the group consisting of ammonia, hydrazine and unsymmetrical dimethyl hydrazine, the by weight amount of ammonium ozonate in said rocket propellant being at least about 70% by weight of the composition.

5. A liquid rocket propellant composition consisting essentially of ammonium ozonate in solution with unsymmetrical dimethyl hydrazine, the ammonium ozonate constituting at least about 70% by weight of the composition.

6. A method of propelling a rocket, which method comprises passing to a rocket reaction chamber a liquid rocket propellant composition consisting essentially of ammonium ozonate and a liquid fuel selected from the group consisting of kerosene, ammonia, hydrazine and unsymmetrical dimethyl hydrazine, the ammonium ozonate constituting at least about 70% by weight of the composition, and igniting said rocket propellant in said chamber.

7. The method of claim 6 wherein said fuel is kerosene.

8. The method of claim 6 wherein said fuel is liquid ammonia.

9. The method of claim 6 wherein said fuel is hydrazine.

10. The method of claim 6 wherein said fuel is dimethyl hydrazine.

References Cited by the Examiner

Manchot: "Deutsche Chemische Gesellschoft," vol. 46, pages 1089–1093 (1913).

Manchot: Ibid., vol. 63B, pp. 1225, 1226 (1930).

Mellor: "Comprehensive Treatise on Inorganic and Theoretical Chemistry," vol. 1, page 908 (1922).

Strecker et al.: "Chemische Berichte," vol. 53, Part II, pages 2096–2113 (1920).

Rideal: "Ozone," 1920, page 14 (copy in Scientific Library).

CARL D. QUARFORTH, *Primary Examiner.*

LEON D. ROSDOL, ROGER L. CAMPBELL, OSCAR R. VERTIZ, *Examiners.*